(12) United States Patent
Scott

(10) Patent No.: US 6,195,706 B1
(45) Date of Patent: Feb. 27, 2001

(54) METHODS AND APPARATUS FOR DETERMINING, VERIFYING, AND REDISCOVERING NETWORK IP ADDRESSES

(75) Inventor: John A. Scott, Cary, NC (US)

(73) Assignee: EMC Corporation, Hopkinton, MA (US)

( * ) Notice: Subject to any disclaimer, the term of this patent is extended or adjusted under 35 U.S.C. 154(b) by 0 days.

(21) Appl. No.: 09/111,349

(22) Filed: Jul. 7, 1998

(51) Int. Cl.[7] ...................................................... G06F 15/16
(52) U.S. Cl. .......................... 709/245; 709/220; 709/222; 709/226
(58) Field of Search .................................... 370/401, 254; 709/220, 245, 226, 222, 244, 223; 713/201

(56) References Cited

U.S. PATENT DOCUMENTS

| | | | |
|---|---|---|---|
| 5,287,103 | * 2/1994 | Kasprzyk et al. | 370/401 |
| 5,526,489 | * 6/1996 | Nilakantan et al. | 709/245 X |
| 5,812,819 | * 9/1998 | Rodwin et al. | 395/500.44 |
| 5,854,901 | * 12/1998 | Cole et al. | 709/245 |
| 5,884,024 | * 3/1999 | Lim et al. | 713/201 |
| 5,918,016 | * 6/1999 | Brewer et al. | 709/220 |
| 5,974,453 | * 10/1999 | Andersen et al. | 709/220 |

OTHER PUBLICATIONS

Chul–Jin Park et al., Improvement for Integrity between DHCP and DNS, 1997, pp. 511–516.*
Finlayson et al., RFC 903: A Reverse Address Resolution Protocol, Jun. 1984, pp. 1–3, 5.*
R. Drom, RFC 2131: Dynamic host Configuration Protocol, Mar. 1997, pp. 1–60.*

* cited by examiner

Primary Examiner—Ahmad F. Matar
Assistant Examiner—Patrice Winder
(74) Attorney, Agent, or Firm—G. D. Clapp, Esq.

(57) ABSTRACT

A method and apparatus for assigning a network address of a target server/host system in a network system having server/host systems interconnected by network links. The apparatus includes a first part residing in a management server/host system and a second part residing in the target server/host system and each part includes a plurality of network address sub-mechanisms and an address manager mechanism for controlling operation of the network address mechanisms. The network address mechanism include, for example, a setup wizard mechanism, a reverse address resolution protocol mechanism, a unit-cast address discovery mechanism and a dynamic host configuration protocol mechanism. The address manager mechanism directs the operation of the network address sub-mechanisms through three modes of operation designated as the address discovery mode, the address verification mode and the operation mode, using each network address sub-mechanism cooperatively and in its own mode of operation, and in certain instances concurrently, to obtain a network address, a sub-network mask and a gateway address for the target server/host system.

3 Claims, 3 Drawing Sheets

METHODS AND APPARATUS FOR DETERMINING, VERIFYING, AND REDISCOVERING NETWORK IP ADDRESSES

FIELD OF THE INVENTION

The present invention relates to an improved method for determining network addresses of host/server systems in a network, such as the Internet Protocol (IP) address of a host/server system in the internet, and, in particular, to improved methods for initially determining an IP address for an uninitiated network server/host system, for verifying the IP address of a network server/host system, and for rediscovering an IP address of a network server/host system when, for example, the server/host system has been moved in the network.

BACKGROUND OF THE INVENTION

The use of networked systems has become common and widespread as offering greatly enhanced access to and communication between a user connected to a network and other users and resources also connected to the network. As is well known and understood, such networked systems are typically comprised of one or more server/host systems and a number of user/client systems, all interconnected through communications links and communicating through a common network protocol. The user/client systems are typically directly accessible to the network users and the server/host systems typically support and provide resources to the user/client systems and communications between user/client systems and between the user/client systems and the server/host systems.

While such systems can and do use a variety of protocols for communication between the elements of the system, one feature and requirement that is common to all such protocols is a means for individually identifying and addressing the elements of a system, that is, the server/host systems and the user/client systems. The internet, for example and as will be discussed further with regard to a presently preferred embodiment of the invention, uses a TCP/IP protocol in which Internet Protocol (IP) addresses, together with domain names and address masks, are used to uniquely identify each individual server/host or user/client in the network and to control the addressing of the server/host and user/client systems in the internet.

The assignment, tracking and maintenance of addresses for system elements in a network is a recurring problem, however, and particularly in the case of the server/host systems which function as the primary controllers of a system. This problem appears whenever a server/host is newly connected into a network and a network address has not been assigned, whenever an address has been assigned to a server/host but has not yet been verified as valid, and when a server/host has been moved to another network address and its address has not been update, or rediscovered.

A number of mechanisms and facilities have been developed in the prior art to deal with these problems. For example, the IP address for an uninitialized network server/host system has typically been determined through the BootP Protocol, the Dynamic Host Configuration Protocol (DHCP), which is an extension of the BootP Protocol, the Reverse Address Resolution Protocol (RARP), or the use of Uni-Cast Ethernet/IP packets, all of which are well known to those of ordinary skill in the relevant arts. In a like manner, DHCP has commonly been used for IP address validation and rediscovery. All of these protocols and methods have proven unsatisfactory, however, as none meet all of the requirements for performing all of the necessary operations. DHCP and BootP Protocol, for example, is inadequate in applications and systems that require that a server/host system be assigned a fixed IP address and in situations wherein a server/host system, such as a World Wide Web server, must be assigned multiple IP addresses.

The present invention provides a solution to these and other problems of the prior art and, while illustrated below for the specific example of an internet system, may be readily implemented for any network based device or system whose primary management interface, that is, the interface through which network addresses are assigned, verified and re-discovered, is network based.

SUMMARY OF THE INVENTION

The present invention is directed to an address discovery and verification apparatus for assigning a network address to a target server/host system in a network system wherein the network system includes a plurality of server/host systems interconnected by network links and the method of operation of the apparatus.

According to the present invention, the address discovery and verification apparatus, and the method for using the apparatus, includes a first part residing in a management server/host system and a second part residing in the target server/host system. The first and second parts of the address discovery/verification mechanism each include a plurality of network address sub-mechanisms, including a setup wizard mechanism, a reverse address resolution protocol mechanism, and a unit-cast address discovery mechanism, and an address manager mechanism for controlling operation of the network address mechanisms.

The address manager mechanism directs the operation of the network address sub-mechanisms through three modes of operation designated as the address discovery mode, the address verification mode and the operation mode.

In the address discovery mode, the address manager mechanism initiates concurrent operation of the reverse address resolution protocol mechanism, the setup wizard mechanism and the unit-cast address discovery mechanism to transmit reverse address resolution protocol requests and to monitor the network links for a reverse address resolution protocol response, to monitor the network links for a setup wizard configuration packet, and to monitor the network links for a uni-cast echo packet. The address manager mechanism the directs the reverse address resolution protocol mechanism, the setup wizard mechanism or the unit-cast address discovery mechanism to extract a received network address from the first received of a reverse address resolution protocol response, a setup wizard configuration packet or a uni-cast echo packet.

The address manager mechanism directs the network address sub-mechanisms in obtaining a subnetwork mask and a gateway address.

If the received network address was received in setup wizard configuration packet, and if the setup wizard configuration packet contained a subnetwork mask and a default gateway address, the address manager mechanism directs the target server/hot system into the verification mode by storing the network address, the subnetwork address and the gateway address in a static memory in the target server/host system and reinitializing operation of the target server/host system..

If the received network address was received in setup wizard configuration packet, and the setup wizard configuration packet did not include a subnetwork mask, the address manager mechanism directs the target server/host system to transmit an ICMP address mask request to a network default broadcast address and to either extract the subnetwork mask when a ICMP address mask response is received or to read a default mask stored in the target server/host system as the subnetwork mask when a ICMP address mask response is not received.

If the setup wizard configuration packet did not include a default gateway address, the address manager mechanism directs the target server/host system to periodically and concurrently transmit a router solicit message and a request message packet and to extract a default gateway address from the first received of either received router advertisement message or a response message packet.

The address manager mechanism then places the target server/host system in the verification mode by storing the network address, the subnetwork address and the gateway address in a static memory in the target server/host system and reinitializing operation of the target server/host system.

The network address sub-mechanisms may also include a dynamic host configuration protocol mechanism that the address manager mechanism will direct to perform an initial attempt. When the dynamic host configuration protocol mechanism successfully assigns a network address to the target server/host, the address manager mechanism will then direct that the network address be stored in a static memory in the target server/host system and reinitializing operation of the target server/host system. When the dynamic host configuration protocol mechanism does not succeed in assigning a network address to the target server/host, the address manager mechanism directs the network address sub-mechanism go to the start of the address discovery mode and initializes operation of the reverse address resolution protocol mechanism, the setup wizard mechanism and the unit-cast address discovery mechanism.

In verification mode, the address manager mechanism waits for the first uni-cast IP packet or Setup wizard packet to be received. If the IP address extracted from the receive packet matches the IP address in static storage, then the address manager directs the target server/host system to enter operation mode. If the extracted IP address does not match the IP address in static storage, then the address manager directs the target server/host system to enter discovery mode.

DESCRIPTION OF A PRESENTLY PREFERRED EMBODIMENT OF THE INVENTION

A. Introduction (FIG. 1)

Figure 1:
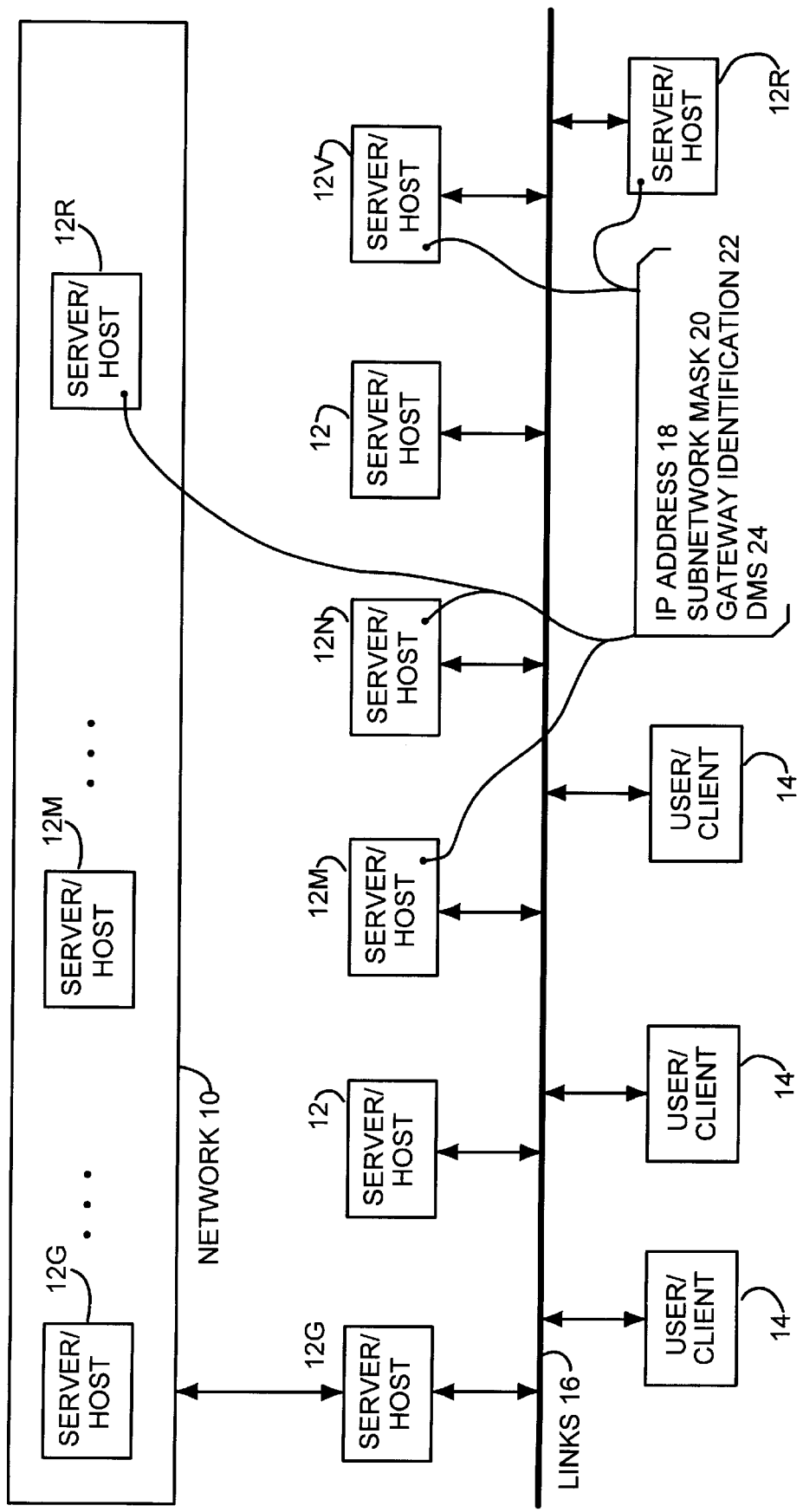
FIG. 1 is a generalized block diagram of a network system in which the present invention may be implemented.

Referring to FIG. 1, therein is shown a generalized block diagram of a Network System 10 in which the present invention may be implemented. As illustrated therein, a typical Network System 10 may include a plurality of Server/Host Systems 12 and a plurality of User/Client Systems 14, with the Server/Host Systems 12 being interconnected by Network Links 16 and the User/Client Systems 14 being connected to the Server/Host Systems 12 through Network Links 16.

As described, the mechanism of the present invention provides a means for discovering, or assigning, the IP address of a Server/Host 12N that has been newly connected into a Network System 10 wherein a network IP address has not been assigned, for verifying a network IP address that has been assigned to a Server/Host 12V, and for rediscovering, or reassigning, a network IP address to a Server/Host 12R that has been moved to another network location, or address.

As is well understood by those of ordinary skill in the relevant arts, in order to function as a Server/Host 12 in a Network System 10, a Server/Host 12N, 12V or 12R must be provided with an IP Address 18 and a Subnetwork Mask 20 that is associated with the Network System 10. This minimum information allows a Server/Host 12N, 12V or 12R to operate as a Server/Host 12 and to be controlled from any of one or more management Servers/Hosts 12M on the Network System 10.

In addition, a Server/Host 12N, 12V or 12R can be controlled from any Server/Host 12M in any other Network System 10 that can be reached through a gateway Server/Host 12G in the same manner as any Server/Host 12, wherein a gateway Server/Host 12 operates as a bridge or link between two or more Network Systems 10 and if the Servers/Hosts 12G are identified to the Server/Host 12N, 12V or 12R. As will be described below, the mechanism of the present invention can provide a Gateway Identification 22 of at least one default gateway Server/Host 12G to a Server/Host 12N, 12V or 12R, as well as other IP address information that may be specific to a given Network System 10, such as Domain Name Service (DNS) 24 information.

B. Components of Address Discovery/Verification Mechanism (ADVM) 26 (FIG. 2)

Figure 2:
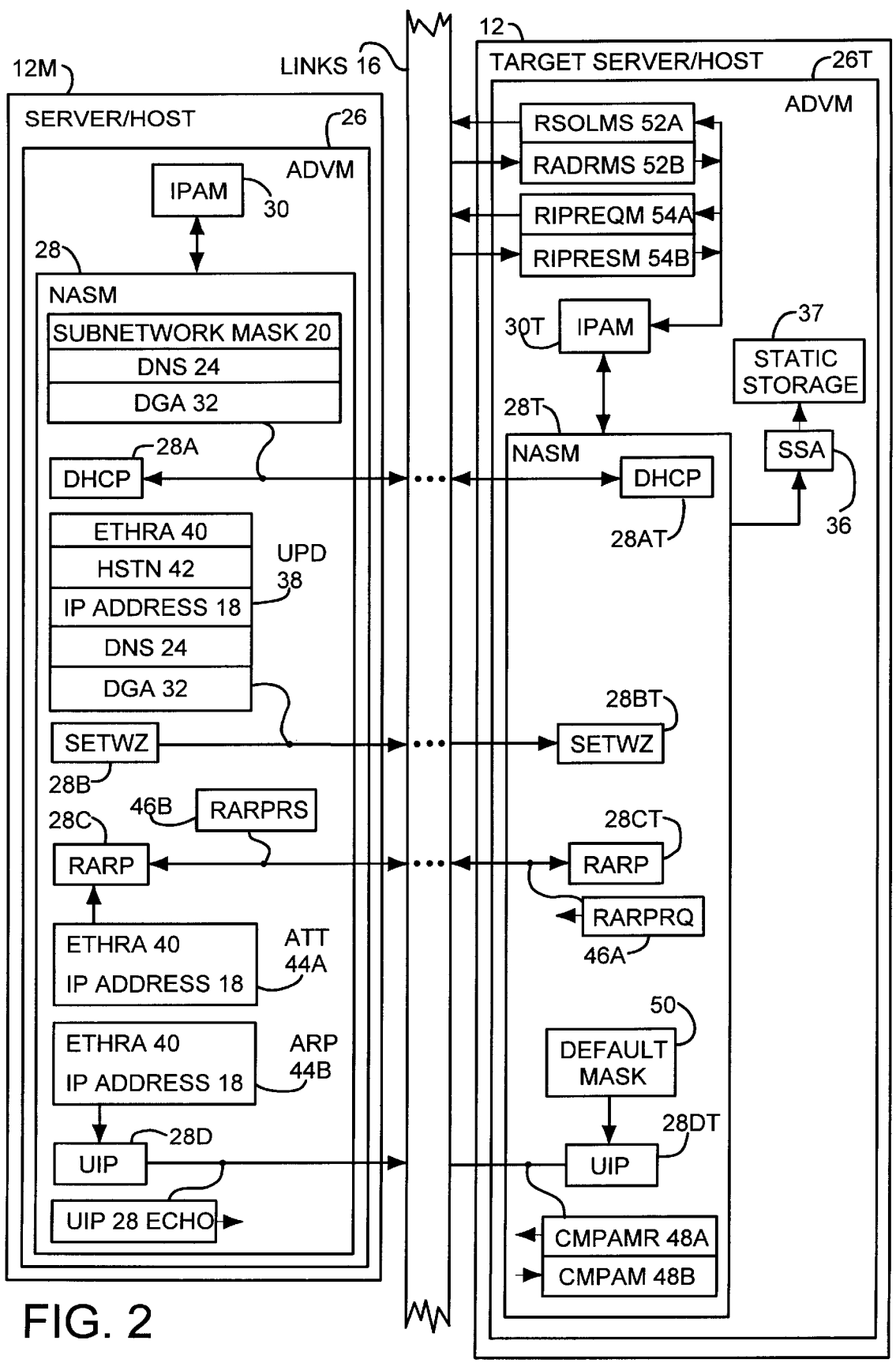
FIG. 2 is a block diagram of the elements and functionalities of the present invention residing in a management server/host of the network system; and, FIG. 3 is a flow diagram illustrating the operation of the present invention.

As illustrated in FIG. 2, the present invention is implemented as an Address Discovery/Verification Mechanism (ADVM) 26 that includes components residing in a Server/Host 12M, including a group of previously existing Network Address Sub-Mechanisms (NASMs) 28 together with an IP Address Manager (IPAM) 30 that controls and coordinates the operations of NASMs 28 to provide results and functions that are not achievable by each of the NASMs 28 individually. As represented in FIG. 2, the NASMs 28 residing in the Server/Host 12M may include Dynamic Host Configuration Protocol (DHCP) 28A, Setup Wizard (SetWz) 28B, Reverse Address Resolution Protocol (RARP) 28C, and Uni-cast IP (UIP) 28D. Other components of ADVM 26, which will also be described below and which are designated as ADVM 26T, may reside in the Server/Host 12N, 12V or 12R, which will hereafter be referred to generally as the Target Server/Host 12. As indicated, the components of ADVM 26T will include an IP Address Manager (IPAM) 30T, which provides functions and operations mirroring and cooperating with those of IPAM 30, and Network Address Sub-Mechanisms (NASMs) 28T, which provide functions and operations mirroring and cooperating with the corresponding NASMs 28 of Server/Host 12M and which include DHCP 28AT, SetWz 28BT, RARP 28CT, and UIP 28DT.

Figure 3:
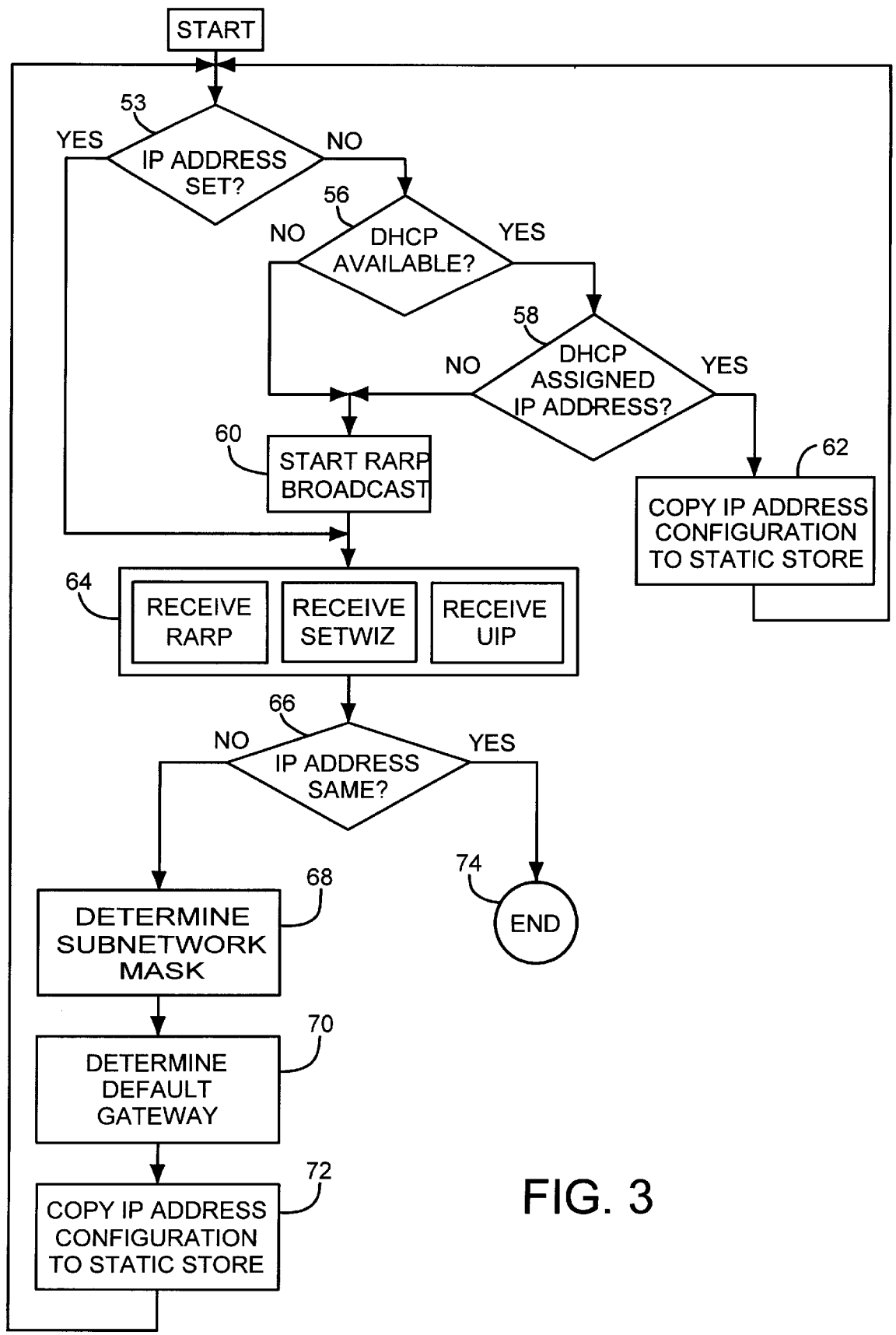

The following will first describe the functions and operations that are or may be performed by each component of ADVM 26, and will then describe the operation of the present invention and those components by reference to FIG. 3.

1. Dynamic Host Configuration Protocol (DHCP) 28A

As will be understood by those of skill in the relevant arts, DHCP 28A can provide a Target Server/Host 12 with a Subnetwork Mask 20, Domain Name Service (DNS) 24 information and Default Gateway Address (DGA) 32 of a default gateway Server/Host 12G. The use of DHCP 28A for these functions can reduce the administrative overhead, especially if multiple Target Servers/Hosts 12 are to be installed or rediscovered.

As has been described, it is necessary in many networks that the IP address information be incorporated in a Target Server/Host 12 as static information. For example, there is a WindowsNT™ restriction which requires static addressing to support multiple IP addresses. In such situations, it is therefore necessary that the addressing information provided by DHCP 28A be converted into static information for use by the Target Server/Host 12. For this reason, the IP address information initially provided from Server/Host 12M to the Target Server/Host 12 is stored therein and on the first subsequent boot, or initialization, of the Target Server/Host 12, a Server Setup Application (SSA) 36 component of ADVM 26T detects that DHCP 28A and DHCP 28AT are enabled, transfers the DHCP 28A IP address information to Static Storage 37 in the Target Server/Host 12 and reboots the Target Server/Host 12. The Target Server/Host 12 thereafter boots normally with static IP addressing.

2. Setup Wizard (SetWz) 28B

If a Server/Host 12M executing DHCP 28A is not available in a Network System 10, a Microsoft Windows application, wsetupwiz.exe, identified in FIG. 2 as Setup Wizard (SetWz) 28B, can be used to transmit a Network Configuration Packet (UDP) 38 to the Target Server/Host 12. A UDP 38 will typically contain the Target Server/Host 12 Ethernet Address (EthrA) 40, a Host Name (HSTN) 42, an IP Address 18, a Subnetwork Mask 20 and possibly a Domain Name Service (DNS) 24 information and a Default Gateway Address (DGA) 32. Upon receiving a UDP 38, a SetWz 28BT component residing in the Target Server/Host 12 will verify that the EthrA 40 matches its controller address and, if the UDP 38 is valid for the Target Server/Host 12, will store the configuration information and reboot.

3. Components Used for Environments Without DHCP or Setup Wizard

If DHCP 28A is not available in a given Network System 10, and if SetWz 28B cannot be used, then other means must be employed to determine and provide the minimum IP addressing information. Accordingly, ADVM 26 uses a combination of alternate methods to determine and provide at least an IP Address 18, a Subnetwork Mask 20 and a Default Gateway Address (DGA) 32. Once the information is gathered and provided to the Target Server/Host 12, the information is written to Static Storage 37 and the Target Server/Host 12 is rebooted, thereafter booting normally with static IP addressing.

4. Reverse Address Resolution Protocol (RARP) 28C

If DHCP 28A is not available in a given Network System 10, and if SetWz 28B cannot be used, ADVM 26 uses either Reverse Address Resolution Protocol (RARP) 28C or Uni-cast IP (UIP) 28D to determine the system IP address.

The use of RARP 28C depends on the availability of a Server/Host 12M executing RARP 28C. If such is present, and prior to booting or initialing the Target Server/Host 12 the first time, a network administrator enters the Target Server/Host 12 Ethernet Address (EthrA) 40 and an IP Address 18 for the Target Server/Host 12 into an Address Translation Table (ATT) 44A in the Server/Host 12M and accessible to RARP 28C. At first boot, a RARP 28CT component of ADVM 26T residing in the Target Server/Host 12 directs the Target Server/Host 12 to periodically transmit a RARP Request (RARPRQ) 46A and to wait for a RARP Response (RARPRS) 46B containing at least the IP Address 18 from RARP 28C in the Server/Host 12M. Once the IP Address 18 has been received and determined by the Target Server/Host 12, wsetupwiz.exe, as Setup Wizard (SetWz) 28B, will generate a Subnetwork Mask 20.

5. Uni-cast IP (UIP) 28D

If RARP 28C is not available, the ADVM 26T component residing in a Target Server/Host 12 can determine the IP Address 18 of the Target Server/Host 12 from the first UIP 28D ECHO (ping) packet transmitted by the Server/Host 12M and addressed to the ethernet address/IP Address 18, of the Target Server/Host 12 network interface. In this instance, the network administrator will enter the EthrA 40 and assigned IP Address 18 for the Target Server/Host 12 into an ARP Table 44B in a Server/Host 12M host residing on the same Network System 10 as the Target Server/Host 12. The Server/Host 12M will "ping" from the Server/Host 12M to the Target Server/Host 12 to the Target Server/Host 12 and will transmit a UIP 28D packet to the Target Server/Host 12. A UIP 28DT component of ADVM 26T residing in Target Server/Host 12 then determines its IP Address 18 by copying the IP destination address from the UID 28D packet.

The UIP 28DT component in Target Server/Host 12 then determines the Target Server/Host 12 Subnetwork Mask 20 by periodically transmitting an ICMP Address Mask Request (CMPAMR) 48A to the network default IP broadcast address (255.255.255.255) until a response ICMP Address Mask (CMPAM) 48B is received. If no response is received within the timeout period, a Default Mask 50 based on the address class of IP Address 18 and previously stored in the Target Server/Host 12 UIP) 28D is used.

6. Determination of a Default Gateway Address (DGA) 32

As described above, the Target Server/Host 12 must have access to a gateway Server/Host 12G, and the network IP address of the Server/Host 12G, to communicate with Servers/Hosts 12 not on the same, local network as the Target Server/Host 12. According to the present invention, ADVM 26/ADVM 26T is provided with two different mechanisms to identify such a gateway Server/Host 12G and the IP address of the Server/Host 12G, the first mechanism being ICMP Router Solicit Messages and the second being Route Information Protocol (RIP) Request Messages. Both methods are used in parallel in the presently preferred embodiment of ADVM 26/ADVM 26T and, if a gateway cannot be determined within a predetermined timeout period, then the Target Server/Host 12 completes the setup without a default gateway.

c1. ICMP Router Solicit Messages

ICMP Router Solicit Messages 52A and ICMP Router Advertisement Messages 52B are defined in the currently proposed standard RFC 1296. As described therein, and as implemented in ADVM 26T, the Target Server/Host 12 periodically transmits an ICMP Router Solicit Message (RSOLMS) 52A, which is essentially a request for information identifying a gateway Server/Host 12G, and waits for an ICMP Router Advertisement Response Message (RADRMS) 52B, which is transmitted by a gateway Server/Host 12G in response to a RSOLMS 52A and contains information identifying a gateway Server/Host 12G and its IP address in the network. The Target Server/Host 12 accepts and reads the first RADRMS 52B that it receives in response to the RSOLMS 52A and accepts the IP address of the responding gateway Server/Host 12G as the Default Gateway Address (DGA) 32.

c2. RIP Request Messages

In a like manner, and concurrently, the Target Server/Host 12 periodically transmits a Route Information Protocol (RIP) Request Message Packet (RIPREQM) 54A, which is essentially a request for information identifying a gateway Server/Host 12G, and waits for a (RIP) Response Message Packet (RIPRESM) 54B, which is transmitted by a gateway Server/Host 12G in response to a RIPREQM 54A and contains information identifying a gateway Server/Host 12G and its IP address in the network. The Target Server/Host 12 accepts and reads the first RIPRESM 54B that it receives in response to the RIPREQM 54A and accepts the IP address of the responding gateway Server/Host 12G as the Default Gateway Address (DGA) 32.

C. Operation of Address Discovery/Verification Mechanism (ADVM) 26 (FIG. 3)

As will be described below with reference to FIG. 3 and the previous discussions, ADVM 26 supports three modes of operation. The first is the discovery mode wherein no IP Address 18 has been set for the Target Server/Host 12, for example, at the initial boot or initialization of the Target Server/Host 12, or the Target Server/Host 12 has been moved to a new network location and the IP Address 18 must be rediscovered. The second mode is the address verification/rediscovery mode that is used when an IP Address 18 has been determined for the Target Server/Host 12 but has not yet been confirmed as valid, such as when the Target Server/Host 12 has been moved to another network but the IP Address 18 has not yet been updated to correspond to the new network location. The third mode is the operation mode wherein the Target Server/Host 12 responds to Setup Wizard (SetWz) 28B configuration packets by communicating its current IP Address 18, but will take no other action and will not respond to other requests or communications.

The following will consider each of the modes of operation of ADVM 26 in turn, with reference to FIG. 3.

1. Discovery Mode

As described above, ADVM 26 enters the discovery mode when no IP Address 18 has been set for the Target Server/Host 12, for example, at the initial boot or initialization of the Target Server/Host 12, and when, therefore, an IP Address 18 must be determined for the Target Server/Host 12.

In the discovery mode, the following steps are performed at each initialization of a Target Server/Host 12, for example when the Target Server/Host 12 is newly installed in a network or when the Target Server/Host 12 has been moved to a new network location or is otherwise to be assigned a new network address:

In Step 53: If the Target Server/Host 12 has a static IP address assigned, then enter verification mode and go to Step 64; otherwise go to Step 56.

In Step 56: Determine whether Network System 10, that is, Server/Host 12M and the Target Server/Host 12 are executing DHCP 28A: if yes, go to Step 58 and if no go to Step 60;

In Step 58: Attempt to assign an IP Address 18 and, in most embodiments, a Subnetwork Mask 20, to the Target Server/Host 12 by means of DHCP 28A and, if the attempt is successful (yes) go to Step 62 and if the attempt is not successful (no) go to Step 60;

In Step 62, Copy the IP Address 18 and the Subnetwork Mask 20 to Static Storage 37, disable DHCP on the Target Server/Host 12 and reinitialize and go to Step 53 with the IP address set.

In Step 60: Start operation of RARP 28C/28CT and start periodically broadcasting RARP Requests (RARPRQs) 42B until either a RARP Response (RARPRS) 44 is received, a Setup Wizard (SetWz) 28B Network Configuration Packet (UDP) 38 is received or a Uni-cast IP (UIP) 28D ECHO (ping) packet is received, whereupon the IP Address 18 is extracted from the RARPRS 44 or the UDP 38 or the UIP 28D ECHO (ping) packet and written to Static Storage 37;

2. Verification/Rediscovery Mode

Step 64: Wait to receive a Setup Wizard (SetWz) 28B Network Configuration Packet (UDP) 38, a Uni-cast IP (UIP) 28D ECHO (ping) packet or a hypertext transfer packet (http) and compare the IP Address 18 contained therein with the IP Address 18 received as a result of Steps 56–64 and, if the IP Address 18 received in the UDP 38, UIP 28D ECHO (ping) or http packet matches (yes) the IP Address 18 received in Steps 56–60, go to Step 74 and, if the IP Address 18 received in the UIP 28D ECHO (ping) or http packet does not match the IP Address 18 received in Steps 56–60 (no), that is, the Target Server/Host 12 has been moved to a new network location or a new IP Address 18 is being assigned, go to Step 66;

Step 66: If a Setup Wizard (SetWz) 28B Network Configuration Packet (UDP) 38 was received in Step 66, check whether a Subnetwork Mask 20 and Default Gateway Address 32 were received in the UDP 38 packet and, if both were received (yes), go to Step 74 in the Operation Mode, and, if a Subnetwork Mask 20 was not received or if a Default Gateway Address (DGA) 32 was not received (no), go to Step 68;

Step 68: If a Subnetwork Mask 20 was not received in Step 66, transmit a ICMP Address Mask Request (CMPAMR) 48A to network default IP broadcast address (255.255.255.255) and, if a ICMP Address Mask (CMPAM) 48B response is received (yes), extract the mask and go to Step 70, and, if a response is not received (no), read the Default Mask 50 based on the address class of IP Address 18 and previously stored in the Target Server/Host 12 and go to Step 70;

Step 70: If a Default Gateway Address (DGA) 32 was not received in Step 66, periodically transmit ICMP Router Solicit Messages (RSOLMs) 52A and RIP Request Message Packets (RIPREQMs) 54A and, if an ICMP Router Advertisement Message (RADRMS) 52B or an RIP Response Message Packet (RIPRESM) 54B is received, extract a gateway address from the received ICMP Router Advertisement Message 52B or an RIP Response Message Packet (RIPRESM) 54B, then go to Step 72;

3. Operation Mode

Step 72: Store the IP Address 18, the Subnetwork Mask 20 and the gateway address, if any, in Static Storage 37 and re-boot the Target Server/Host 12 and go to Step 53.

Step 73: The address discovery/verification process Ends and the Target Server/Host 12 begins operation. In operation mode, the Target Server/Host 12 replies to SetWz 28B configuration packets by responding with its current IP Address 18, but no other action is taken.

Finally, while the invention has been particularly shown and described herein above with reference to preferred embodiments of the apparatus and methods thereof, it will be also understood by those of ordinary skill in the art that various changes, variations and modifications in form, details and implementation may be made therein without departing from the spirit and scope of the invention as defined by the appended claims. Therefore, it is the object of the appended claims to cover all such variation and modifications of the invention as come within the true spirit and scope of the invention.

What is claimed is:

1. For use in a network system including a plurality of server/host systems interconnected by network links, a method for assigning a network address of a target server/host system by operation of an address discovery/ verification mechanism having a first part residing in a management server/host system and a second part residing in the target server/host system, the first and second parts of the address discovery/verification mechanism each including a plurality of network address sub-mechanisms, including a setup wizard mechanism, a reverse address resolution protocol mechanism, a unit-cast address discovery mechanism and an address manager mechanism for controlling operation of the network address mechanisms, comprising the steps of:
- (A) when the manager server/host and the target server/host each include a including a dynamic host configuration protocol mechanism,
  - (1) attempting to assign a network address to the target server/host by operation of the dynamic host configuration protocol mechanism in the manager and target server/host systems,
- (B) when the dynamic host configuration protocol mechanism assigns a network address to the target server/host,
  - (1) storing the network address in a static memory in the target server/host system, and
  - (2) disabling DHCP on the target server/host and
  - (3) going to step (F),
- (C) when the dynamic host configuration protocol mechanism does not assign a network address to the target server/host system, initiating operation of the reverse address resolution protocol mechanism, the setup wizard mechanism and the unit-cast address discovery mechanism and concurrently
  - (1) transmitting reverse address resolution protocol requests and monitoring the network links for a reverse address resolution protocol response,
  - (2) monitoring the network links for a setup wizard configuration packet, and
  - (3) monitoring the network links for a uni-cast echo packet, and
  - (4) extracting a network address from the first received of a reverse address resolution protocol response, a setup wizard configuration packet and a uni-cast echo packet,
- (D) comparing the network address received in step (C) with the network address in static memory and
  - (1) when the network address in static memory is the same as the network address received in step (C), go to step (G),
- (E) when the network address in static memory is different from the network address received in step (C),
  - (1) store the network address received in step (C) and
  - (2) if the network address was received in setup wizard configuration packet, and
  - (3) when the setup wizard configuration packet contained a subnetwork mask and a default gateway address, going to step (F), and
  - (4) when the setup wizard configuration packet did not include a subnetwork mask,
    - (a) transmitting a ICMP address mask request to a network default broadcast address, and
    - (b) when a ICMP address mask response is received, extracting the subnetwork mask,
    - (c) when a ICMP address mask response is not received, reading a default mask stored in the target server/host system as the subnetwork mask,
  - (5) when the setup wizard configuration packet did not include a default gateway address,
    - (a) periodically and concurrently transmitting a router solicit message and a request message packet, and
    - (b) when a router advertisement message or a response message packet is received, extracting the default gateway address from the received router advertisement message or a response message packet, and
- (F) storing the network address, the subnetwork address and the gateway address in a static memory in the target server/host system and reinitializing operation of the target server/host system and
- (G) placing the target server/host system in the operating mode.

2. An address discovery/verification mechanism for use in a network system for assigning a network address of a target server/host system, the network system including a plurality of server/host systems interconnected by network links and the address discovery/verification mechanism comprising:

a first part residing in a management server/host system and a second part residing in the target server/host system, the first and second parts of the address discovery/verification mechanism each including a plurality of network address sub-mechanisms, including a setup wizard mechanism, a reverse address resolution protocol mechanism, and a unit-cast address discovery mechanism, an address manager mechanism for controlling operation of the network address mechanisms for executing the operating steps of

- (A) initiating operation of the reverse address resolution protocol mechanism, the setup wizard mechanism and the unit-cast address discovery mechanism and concurrently
  - (1) transmitting reverse address resolution protocol requests and monitoring the network links for a reverse address resolution protocol response,
  - (2) monitoring the network links for a setup wizard configuration packet, and
  - (3) monitoring the network links for a uni-cast echo packet, and
  - (4) extracting a received network address from the first received of a reverse address resolution protocol response, a setup wizard configuration packet and a uni-cast echo packet,
- (B) verifying the received network address by
  - (1) extracting a next received network address from the next received of a setup wizard configuration packet, a uni-cast echo packet and a hypertext transfer packet, and
  - (2) comparing the next received network address with the received network address, and
  - (3) when the next received network address is different from the received network address, returning to step (A),
- (C) when the next received network address is the same as the received network address and the received network address was received in setup wizard configuration packet, and
  - (1) when the setup wizard configuration packet contained a subnetwork mask and a default gateway address, going to step (D), and
  - (2) when the setup wizard configuration packet did not include a subnetwork mask,
    - (a) transmitting a ICMP address mask request to a network default broadcast address, and
    - (b) when a ICMP address mask response is received, extracting the subnetwork mask, (c) when a ICMP address mask response is not received, reading a default mask stored in the target server/host system as the subnetwork mask, (3) when the setup wizard configuration packet did not include a default gateway address, (a) periodically and concurrently transmitting a router solicit message and a request message packet, and (b) when a router advertisement message or a response message packet is received, extracting the default gateway address from the received router advertisement message or a response message packet, and (D) placing the target server/host system in the operating mode by storing the network address, the subnetwork address and the gateway address in a static memory in the target server/host system and reinitializing operation of the target server/host system.

3. The address discovery/verification mechanism for use in a network system for assigning a network address of a target server/host system of claim 2, further comprising:

a dynamic host configuration protocol mechanism for
initially attempting to assign a network address to the target server/host by operation of the dynamic host configuration protocol mechanism in the manager and target server/host systems, and, when the dynamic host configuration protocol mechanism assigns a network address to the target server/host, storing the network address in a static memory in the target server/host system, initiating the address manager mechanism for controlling operation of the network address mechanisms for executing the operating step (D) of placing the target server/host system in the operating mode by storing the network address, the subnetwork address and the gateway address in a static memory in the target server/host system and reinitializing operation of the target server/host system, and when the dynamic host configuration protocol mechanism does not assign a network address to the target server/host, initiating operation of the reverse address resolution protocol mechanism, the setup wizard mechanism and the unit-cast address discovery mechanism and concurrently initiating execution of the operating steps of (1) transmitting reverse address resolution protocol requests and monitoring the network links for a reverse address resolution protocol response, (2) monitoring the network links for a setup wizard configuration packet, and (3) monitoring the network links for a unicast echo packet, and (4) extracting a received network address from the first received of a reverse address resolution protocol response, a setup wizard configuration packet and a uni-cast echo packet.

* * * * *